(12) United States Patent
Li et al.

(10) Patent No.: US 9,057,464 B2
(45) Date of Patent: Jun. 16, 2015

(54) THREADED PIPE CONNECTOR

(71) Applicant: TIANJIN TIANGANG OIL-SPECIAL PIPE MANUFACTURE CO., LTD., Tianjin (CN)

(72) Inventors: Shuqin Li, Tianjin (CN); Bao Zhang, Tianjin (CN)

(73) Assignee: TIANJIN TIANGANG OIL-SPECIAL PIPE MANUFACTURE CO., LTD., Tianjin (CN)

( * ) Notice: Subject to any disclaimer, the term of this patent is extended or adjusted under 35 U.S.C. 154(b) by 310 days.

(21) Appl. No.: 13/734,977

(22) Filed: Jan. 5, 2013

(65) Prior Publication Data

US 2013/0119657 A1 May 16, 2013

Related U.S. Application Data

(63) Continuation-in-part of application No. PCT/CN2010/075334, filed on Jul. 21, 2010.

(30) Foreign Application Priority Data

Jul. 7, 2010 (CN) .......................... 2010 1 0218454

(51) Int. Cl.
*F16L 15/06* (2006.01)
*E21B 17/042* (2006.01)
*F16L 15/00* (2006.01)

(52) U.S. Cl.
CPC ............... *F16L 15/06* (2013.01); *E21B 17/042* (2013.01); *F16L 15/004* (2013.01)

(58) Field of Classification Search
CPC ....... E21B 17/042; F16L 15/004; F16L 15/06
See application file for complete search history.

(56) References Cited

U.S. PATENT DOCUMENTS

| 5,419,595 A * | 5/1995 | Yamamoto et al. ........... 285/334 |
| 5,829,797 A * | 11/1998 | Yamamoto et al. ........... 285/333 |
| 8,215,386 B2 * | 7/2012 | Manke et al. ............... 166/242.7 |

\* cited by examiner

*Primary Examiner* — James Hewitt
(74) *Attorney, Agent, or Firm* — Matthias Scholl P.C.; Matthias Scholl

(57) ABSTRACT

A threaded pipe connector, including: a pipe body including an external thread on one end; and a coupling including an internal thread on a corresponding end. Both the external thread and the internal thread are buttress threads capable of matching with each other. A ratio of thread height to pitch is 0.25-0.35, bearing surface angle is −15-3°, and guide surface angle is 10-50°. A clearance is provided between a thread crest and a thread root after engagement of the external and internal threads. A sealing area between the pipe body and the coupling includes in sequence a first cylindrical transitional area, a cylindrical sealing area, a secondary cylindrical transitional area, a conical sealing area, and a conical transitional area. Tapers of both sides of the conical sealing area are the same. One end of the conical transitional area is connected with a torque shoulder.

14 Claims, 6 Drawing Sheets

THREADED PIPE CONNECTOR

CROSS-REFERENCE TO RELATED APPLICATIONS

This application is a continuation-in-part of International Patent Application No. PCT/CN2010/075334 with an international filing date of Jul. 21, 2010, designating the United States, now pending, and further claims priority benefits to Chinese Patent Application No. 201010218454.8 filed Jul. 7, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a threaded pipe connector.

2. Description of the Related Art

A typical threaded pipe connector used in petroleum and natural gas industry generally includes thread, seal, and torque shoulder, which are modified constantly over years to meet design requirements for strength and airtight.

For designing threaded sleeves with big caliber, thick-wall, and high grade steel, using only API buttress thread may lead to pull-out failure, so it's extremely important to choose optimal ratio of thread flank angle and thread height to pitch.

Coupling threads fall into two categories: single stage seal and multistage seal in term of sealing design. Sealing interference, sealing length or both shall be increased to ensure high performance sealing, which requires high processing precision and has tendency to galling. Multistage sealing can reduce drawbacks of single stage sealing, but two sealing faces are not separated in conventional multistage thread configuration, it makes no difference with single stage seal in performance, and sacrifices reliability. Sealing surfaces are separated in the multistage shoulder with double torque shoulder, but processing is very difficult and yield is pretty low.

SUMMARY OF THE INVENTION

In view of the above-described problems, it is one objective of the invention to provide a threaded pipe connector used in petroleum and natural gas industry that features good sealing stability.

To achieve the above objective, in accordance with one embodiment of the invention, there is provided a threaded pipe connector comprising a pipe body comprising an external thread on one end and a coupling comprising an internal thread a corresponding end. Both the external thread on the pipe body and the internal thread on the coupling are buttress threads that can match with each other. The ratio of thread height to pitch is 0.25-0.35, bearing surface angle t2 is −15-3°, guide surface angle t1 is 10-50°. A clearance between a thread crest and a thread root ranges from 0.05 to 0.2 mm after engagement of the external and internal threads. A thread taper at diameter direction is 1:20-1:10. The sealing area between the pipe body and the coupling comprises in sequence a first cylindrical transitional area, a cylindrical sealing area, a secondary cylindrical transitional area, a conical sealing area, and a conical transitional area, taper of both sides of the conical sealing area are the same. One end of the conical transitional area is connected with a torque shoulder.

In a class of this embodiment, a sealing area for the external pipe thread on one side of the pipe body comprises in sequence a first external cylindrical transitional surface, an external cylindrical sealing surface, a secondary external cylindrical transitional surface, an external conical sealing area, and an external conical transitional area; the external conical transitional surface is connected with an external torque shoulder; a sealing area for the internal pipe thread on one side of the coupling comprises in sequence a first internal cylindrical area, a secondary internal cylindrical surface, and an internal conical surface; the internal conical surface is connected with an internal torque shoulder; a clearance between the first external cylindrical transitional surface and the first internal cylindrical surface forms the first cylindrical transitional area; interference fit between the external cylindrical sealing area and the secondary internal cylindrical surface area forms the cylindrical sealing area; the clearance between the secondary external cylindrical transitional surface and the secondary internal cylindrical surface area forms the secondary transitional area; interference fit between the external conical sealing area and the internal conical surface forms the conical sealing area; a clearance between the external conical transitional surface and the internal conical surface area forms the conical transitional area; taper angles for both the external conical sealing surface and the internal conical surface are the same; included angles between the external torque shoulder surface and the axial vertical plane of the pipe body, and between internal torque shoulder surface and the axial vertical plane of the pipe body are between −30 and 0°.

In a class of this embodiment, the cylindrical sealing area is of high interference and short sealing length configuration, and the conical sealing area is of low interference and long sealing length configuration.

In a class of this embodiment, diametrical interference for the cylindrical sealing area is between 0.3 and 1.5 mm, sealing length for the cylindrical sealing area is larger than half of the thread pitch; the diametrical interference for the conical sealing area is between 0.1 and 0.5 mm, and sealing length for the conical sealing area is between 2 and 10 mm.

In a class of this embodiment, a taper of the threads at diameter direction is between 1:20 and 1:10.

In a class of this embodiment, the taper angle for the external conical transitional surface is between 30 and 60°.

In a class of this embodiment, circular arc transitions are adopted for discontinuous surfaces, and arc radius ranges from 0.3 to 1 mm.

In a class of this embodiment, the clearance between the thread crest and the thread root ranges from 0.05 to 0.2 mm after engagement of the external and internal threads.

In a class of this embodiment, the taper angles for the external conical sealing surface and the internal conical surface are between 10 and 20°.

Advantages of the invention are summarized below:
1) The threaded pipe connector improves connection strength and avoids pull-out by using modified API buttress thread;
2) The threaded pipe connector adopts compound seal comprising cylindrical and conical seal, and separate two sealing faces from one another effectively through cylindrical transitional area to ensure sealing reliability;
3) The threaded pipe connector adopts circular arc transition to lower stress concentration and avoid fatigue crack caused by fragile material rupture, and strengthens connection;

4) The threaded pipe connector adopts compound seal in cylindrical and conical configuration, which can help reduce processing precision requirements, lower processing difficulty, facilitate mass production, improve production efficiency, lower production cost and improve yield rate; and 5) For threaded pipe connector of the invention, in addition to sealing part have interference, there is certain clearances in other parts after make-up of internal and external thread, which can help reduce tendency to galling.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a threaded pipe connector are described below. It should be noted that the following examples are intended to describe and not to limit the invention.

Figure 1:
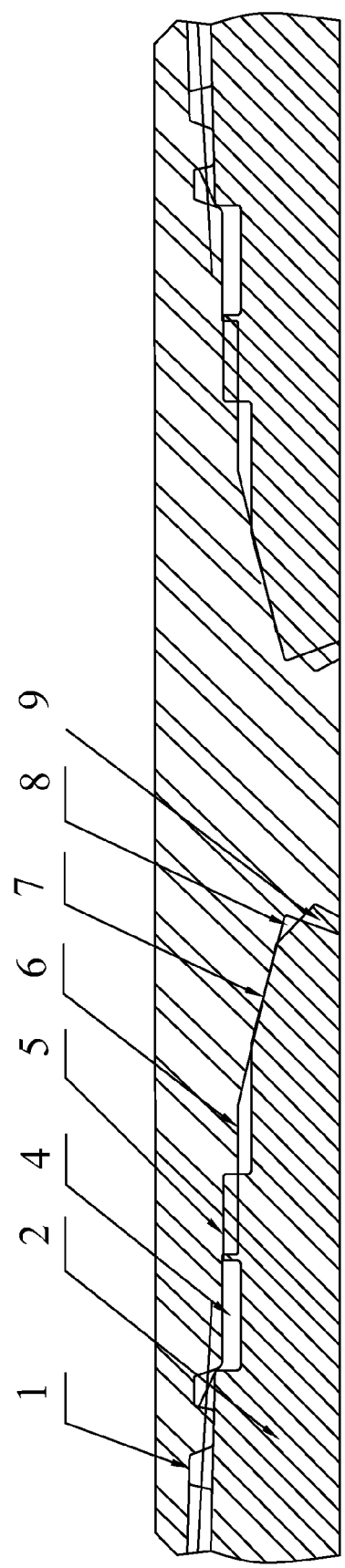
FIG. 1 is a schematic diagram of a threaded pipe connector in accordance with one embodiment of the invention.
Figure 2:
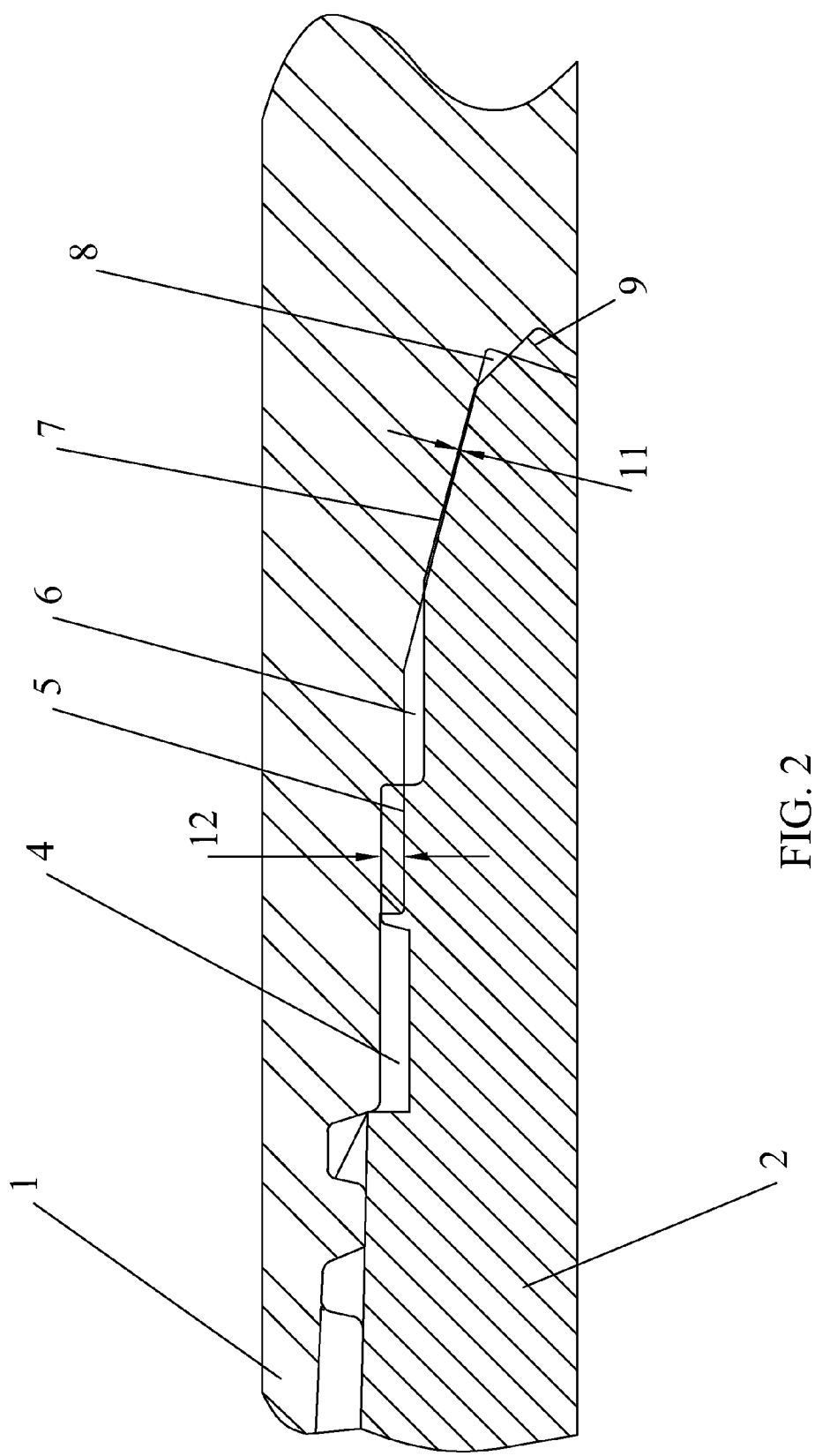
FIG. 2 is a local enlarged view of a sealing area of a threaded pipe connector in accordance with one embodiment of the invention.
Figure 3:
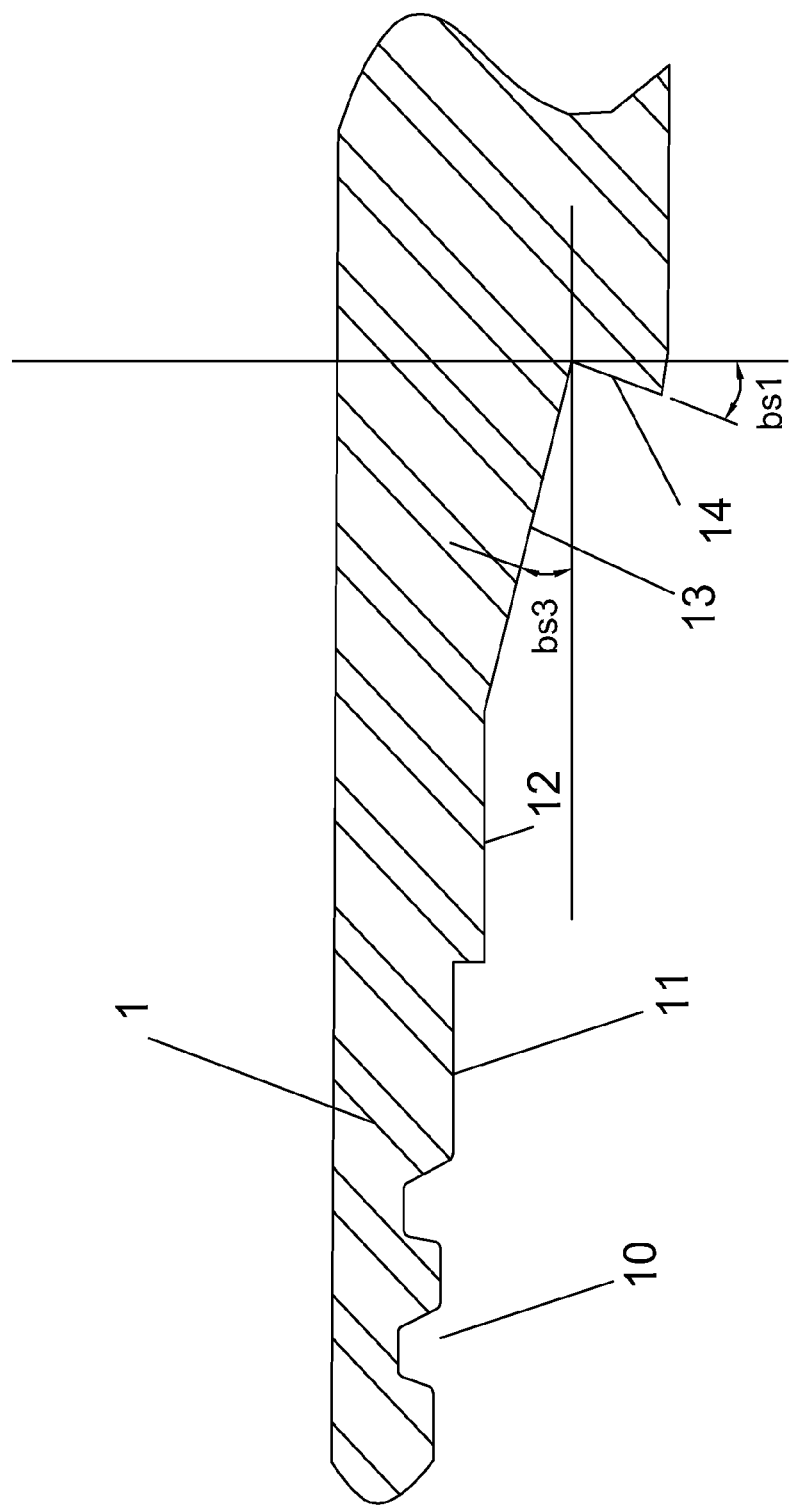
FIG. 3 is a schematic diagram of an internal thread of a coupling of a threaded pipe connector in accordance with one embodiment of the invention.
Figure 4:
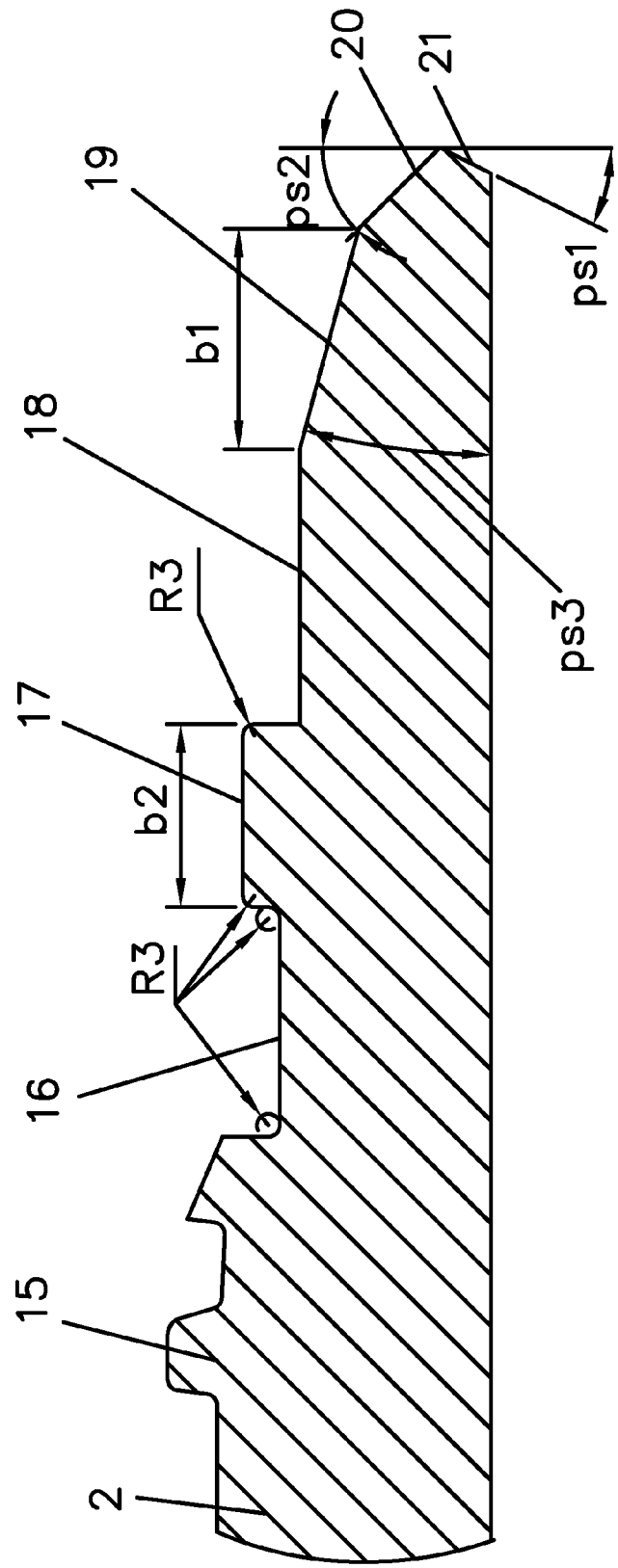
FIG. 4 is a schematic diagram of an external thread of a pipe body of a threaded pipe connector in accordance with one embodiment of the invention.
Figure 5:
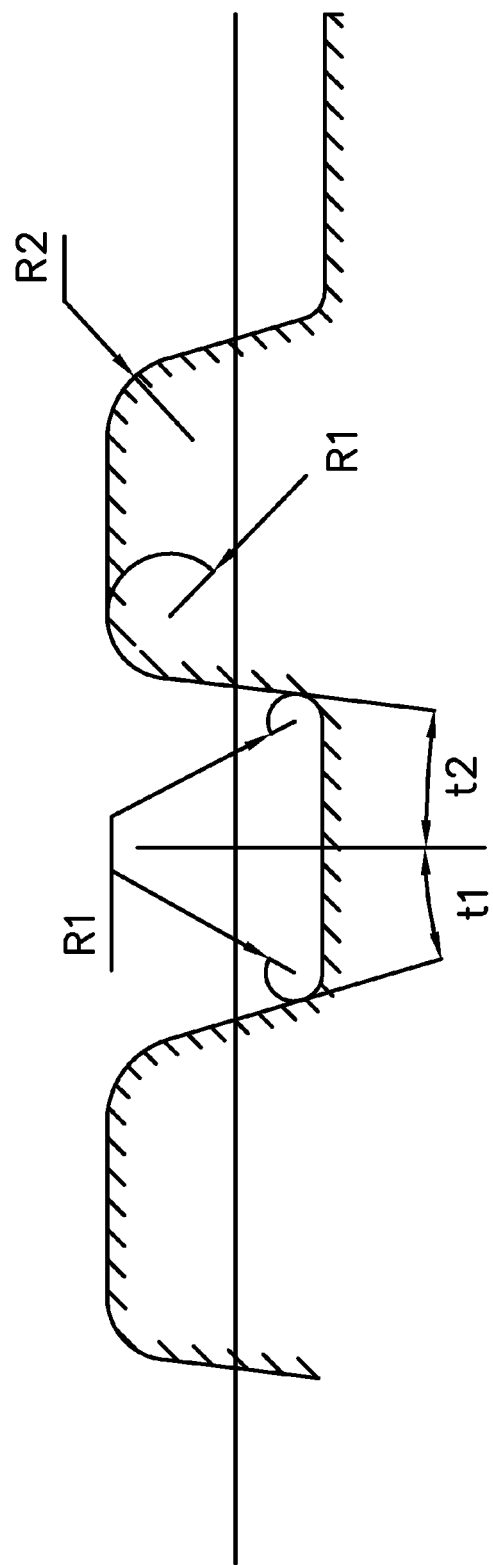
FIG. 5 is a schematic diagram showing a shape of a screw thread in accordance with one embodiment of the invention.
Figure 6:
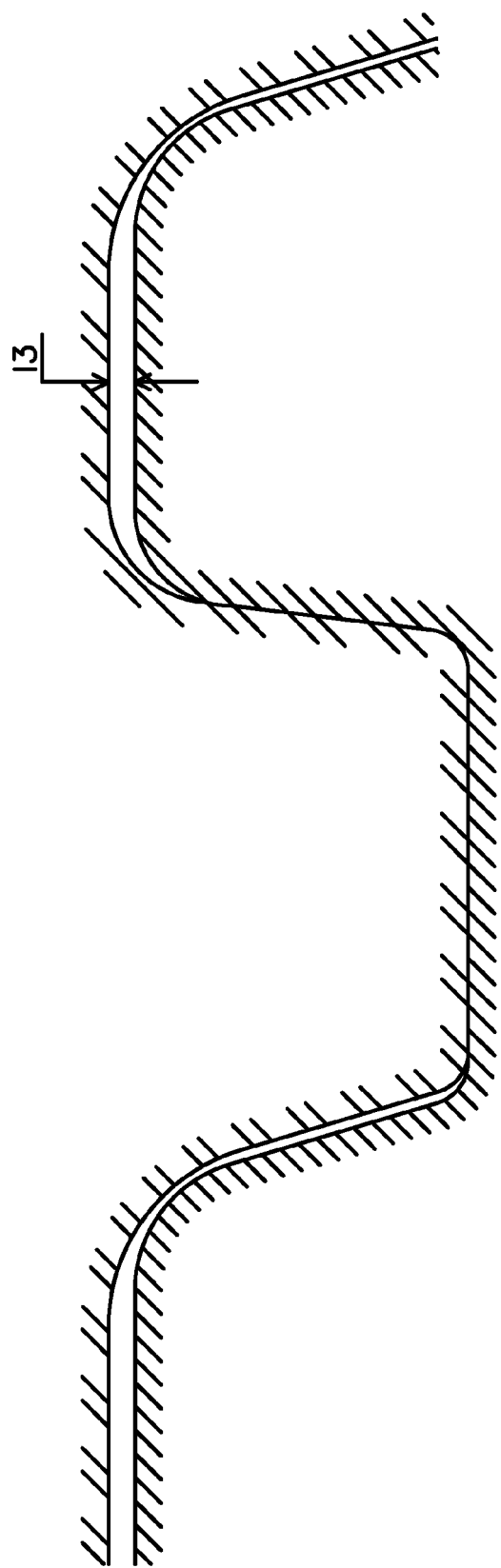
FIG. 6 is a schematic diagram of engaged threads in accordance with one embodiment of the invention.

As shown in FIGS. 1-6, a threaded pipe connector used in petroleum and natural gas industry comprises a pipe body 2 comprising an external thread 15 on one end and a coupling 1 comprising an internal thread 10 on a corresponding end. Both the external thread 15 on the pipe body 2 and the internal thread 10 on the coupling 1 are buttress threads that can match with each other. The ratio of thread height to pitch is 0.25-0.35, bearing surface angle t2 is −15-3°, guide surface angle t1 is 10-50°, so that the connector's performance between threads with varying size and steel grade is ensured. A clearance I3 between a thread crest and a thread root ranges from 0.05 to 0.2 mm after engagement of the external and internal threads. A thread taper at diameter direction is 1:20-1:10. The sealing area between the pipe body and the coupling comprises in sequence a first cylindrical transitional area 4, a cylindrical sealing area 5, a secondary cylindrical transitional area 6, a conical sealing area 7, and a conical transitional area 8, taper of both sides of the conical sealing area are the same. One end of the conical transitional area 8 is disposed with a torque shoulder 9. The first cylindrical transitional area 4 is used as transition between the external pipe thread 15 and the internal coupling thread 10 and the cylindrical sealing area 5, which can avoid damage caused by engagement. The secondary cylindrical transitional area 6 is used to separate the cylindrical sealing area 5 effectively from the conical sealing area 7. The conical transition area 8 is used to realize smooth transition between the pipe body and the coupling to ensure the sealing performance. The torque shoulder 9 is used for location during the make-up and absorbing excessive make-up torque. All the transitional area can be used to store superfluous grease and lower grease's impact to metallic seal.

Circular arc transitions are adopted for all discontinuous surfaces to prevent stress concentration, arc radius R1, R2, and R3 ranges from 0.3 to 1 mm.

The design of the transitional and sealing area is achieved by following pipe body and coupling configuration. A sealing area for the external pipe thread 15 on the side of the pipe body 2 comprises in sequence a first external cylindrical transitional surface 16, an external cylindrical sealing surface 17, a secondary external cylindrical transitional surface 18, an external conical sealing area 19, and an external conical transitional area 20. The external conical transitional surface 20 is connected with an external torque shoulder 21. A sealing area for the internal pipe thread 10 on the side of coupling 1 comprises in sequence a first internal cylindrical area 11, a secondary internal cylindrical surface 12, and an internal conical surface 13. The internal conical surface 13 is connected with an internal torque shoulder 14. The clearance between the first cylindrical transitional surface 16 and the first internal cylindrical surface 11 forms the first cylindrical transitional area 4. Interference fit between the external cylindrical sealing area 17 and the secondary internal cylindrical surface area 12 forms the cylindrical sealing area 5, thereby achieving the metal-to-metal sealing. The clearance between the secondary external cylindrical transitional surface 18 and the secondary internal cylindrical surface area 12 forms the secondary transitional area 6. Interference fit between the external conical sealing area 19 and the internal conical surface 13 forms the conical sealing area 7, thereby achieving the metal-to-metal sealing. The clearance between the external conical transitional surface 20 and the internal conical surface area 13 forms the conical transitional area 8. Taper angles for both the external conical sealing surface 19 and the internal conical surface 13 are the same, both the taper angles for the external conical sealing surface and the internal conical surface are 10-20°, namely ps3=bs3=10-20°. The included angle between the external torque shoulder surface 21 and the axial vertical plane of the pipe body is ps1, the included angle between internal torque shoulder surface 14 and the axial vertical plane of the pipe body is bs1, and bs1=ps1=−30-0°.

The cylindrical sealing area is of high interference and short sealing length configuration to avoid reduction in sealing performance due to axial loads. Diametrical interference I2 for the cylindrical sealing area is generally 0.3-1.5 mm, sealing length b2 for cylindrical sealing area is larger than half of the thread pitch. The conical sealing area is of low interference and long sealing length configuration. The conical sealing can lower the tendency for galling. The diametrical interference I1 for the conical sealing area is generally 0.1-0.5 mm, and sealing length b1 for conical sealing area is 2-10 mm.

The taper angle ps2 for the external conical transitional surface 20 is 30-60°.

Example 1

The following is the detailed description for a 88.9×6.45 mm tubing.

The thread pitch is 4.2 mm. The external thread height is 1 mm. The internal thread height is 1.1 mm. The ratio of the internal thread height to pitch is 0.26. Because the difference between the external thread height and internal thread height is 0.1 mm, there will be 0.1 mm clearance I3 between the internal thread root and the external thread crest. The bearing surface angle t2=−10°, guide surface angle t1=30°, chamfering R1=0.3 mm, R2=0.6 mm, ps1=bs1=−10°, ps2=30°, ps3=bs3=10°, b1=3 mm, b2=2.5 mm, R3=0.5 mm, I1=0.2 mm, I2=0.3 mm. The thread taper at diameter direction is 1/16.

Example 2

The following is the detailed description for a 177.8×9.19 mm tubing.

The thread pitch is 5.08 mm. The external thread height is 1.47 mm. The internal thread height is 1.57 mm. The ratio of the internal thread height to pitch is 0.31. Because the difference between the external thread height and internal thread height is 0.1 mm, there will be 0.1 mm clearance I3 between the internal thread root and the external thread crest. The bearing surface angle t2=3°, guide surface angle t1=10°, chamfering R1=0.5 mm, R2=0.8 mm, ps1=bs1=0°, ps2=45°, ps3=14°, b1=5 mm, b2=3 mm, R3=0.5 mm, I1=0.4 mm, I2=0.6 mm. The thread taper at diameter direction is 1/16.

The threaded pipe connector of the invention is suitable for tubing and sleeve in petroleum and gas industry, which can be used in high pressure oil and gas well. With high reliability and low processing requirements, the threaded pipe connector can be used in oil and gas well that requires high sealing performance, particularly suitable for high pressure oil and gas well, in addition, it's more effective for sleeve of high steel grade and large caliber, with broad application prospect.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A threaded pipe connector, comprising:
   a) a pipe body comprising an external thread on one end; and
   b) a coupling comprising an internal thread on a corresponding end;
   wherein
   both the external thread and the internal thread are buttress threads capable of matching with each other;
   a ratio of thread height to pitch is between 0.25 and 0.35, bearing surface angle is between −15 and 3°, and guide surface angle is between 10 and 50°;
   a clearance is provided between a thread crest and a thread root after engagement of the external and internal threads;
   a sealing area between the pipe body and the coupling comprises in sequence a first cylindrical transitional area, a cylindrical sealing area, a secondary cylindrical transitional area, a conical sealing area, and a conical transitional area;
   tapers of both sides of the conical sealing area are the same; and
   one end of the conical transitional area is connected with a torque shoulder.

2. The threaded pipe connector of claim 1, wherein
   a sealing area for the external pipe thread on one side of the pipe body comprises in sequence a first external cylindrical transitional surface, an external cylindrical sealing surface, a secondary external cylindrical transitional surface, an external conical sealing surface, and an external conical transitional surface;
   the external conical transitional surface is connected with an external torque shoulder;
   a sealing area for the internal pipe thread on one side of the coupling comprises in sequence a first internal cylindrical surface, a secondary internal cylindrical surface, and an internal conical surface;
   the internal conical surface is connected with an internal torque shoulder;
   a clearance between the first external cylindrical transitional surface and the first internal cylindrical surface forms the first cylindrical transitional area;
   interference fit between the external cylindrical sealing surface and the secondary internal cylindrical surface surface forms the cylindrical sealing area;
   the clearance between the secondary external cylindrical transitional surface and the secondary internal cylindrical surface surface forms the secondary cylindrical transitional area;
   interference fit between the external conical sealing surface and the internal conical surface forms the conical sealing area;
   a clearance between the external conical transitional surface and the internal conical surface surface forms the conical transitional area;
   taper angles for both the external conical sealing surface and the internal conical surface are the same;
   included angles between the external torque shoulder and the axial vertical plane of the pipe body, and between internal torque shoulder and the axial vertical plane of the pipe body are between −30 and 0°.

3. The threaded pipe connector of claim 1, wherein the cylindrical sealing area is of high interference and short sealing length configuration, and the conical sealing area is of low interference and long sealing length configuration.

4. The threaded pipe connector of claim 2, wherein the cylindrical sealing area is of high interference and short sealing length configuration, and the conical sealing area is of low interference and long sealing length configuration.

5. The threaded pipe connector of claim 3, wherein diametrical interference for the cylindrical sealing area is between 0.3 and 1.5 mm, sealing length for the cylindrical sealing area is larger than half of the thread pitch; the diametrical interference for the conical sealing area is between 0.1 and 0.5 mm, and sealing length for the conical sealing area is between 2 and 10 mm.

6. The threaded pipe connector of claim 4, wherein diametrical interference for the cylindrical sealing area is between 0.3 and 1.5 mm, sealing length for the cylindrical sealing area is larger than half of the thread pitch; the diametrical interference for the conical sealing area is between 0.1 and 0.5 mm, and sealing length for the conical sealing area is between 2 and 10 mm.

7. The threaded pipe connector of claim 3, wherein the taper angle for the external conical transitional surface is between 30 and 60°.

8. The threaded pipe connector of claim 4, wherein the taper angle for the external conical transitional surface is between 30 and 60°.

9. The threaded pipe connector of claim 3, wherein circular arc transitions are adopted for discontinuous surfaces, and arc radius ranges from 0.3 to 1 mm.

10. The threaded pipe connector of claim 4, wherein circular arc transitions are adopted for discontinuous surfaces, and arc radius ranges from 0.3 to 1 mm.

11. The threaded pipe connector of claim 3, wherein the clearance between the thread crest and the thread root ranges from 0.05 to 0.2 mm after engagement of the external and internal threads.

12. The threaded pipe connector of claim 4, wherein the clearance between the thread crest and the thread root ranges from 0.05 to 0.2 mm after engagement of the external and internal threads.

13. The threaded pipe connector of claim 3, wherein the taper angles for the external conical sealing surface and for the internal conical surface are between 10 and 20°.

14. The threaded pipe connector of claim 4, wherein the taper angles for the external conical sealing surface and for the internal conical surface are between 10 and 20°.

* * * * *